United States Patent [19]
Linnecke

[11] Patent Number: 5,036,569
[45] Date of Patent: Aug. 6, 1991

[54] FILTER/FUNNEL ASSEMBLY MACHINE

[75] Inventor: Carl Linnecke, Arcadia, Calif.

[73] Assignee: V-Tech, Inc., Pomona, Calif.

[21] Appl. No.: 474,542

[22] Filed: Feb. 2, 1990

[51] Int. Cl.⁵ .............................................. B23P 19/04
[52] U.S. Cl. ..................................... 29/33 K; 29/783
[58] Field of Search ............... 29/564.1, 564.6, 402.05, 29/148.4 A, 163.8, 453, 429, 430, 33 K, 773, 783; 156/262, 261, 515, 516; 210/445, 446; 198/341, 342.3

[56] References Cited

U.S. PATENT DOCUMENTS

| | | | |
|---|---|---|---|
| 2,222,605 | 11/1940 | Carlson | 29/33 K |
| 3,466,731 | 9/1969 | Acton et al. | 29/429 |
| 3,623,210 | 11/1971 | Shields | 29/429 |
| 3,837,065 | 9/1974 | Abbe et al. | 29/429 |
| 3,973,313 | 8/1976 | Hunter | 29/163.8 |
| 3,977,060 | 8/1976 | Ishikawa | 29/163.8 X |
| 4,178,672 | 12/1979 | Amico et al. | 29/783 X |
| 4,369,570 | 1/1983 | Madden | 29/773 X |
| 4,623,461 | 11/1986 | Hossom et al. | 210/445 |

FOREIGN PATENT DOCUMENTS

| | | | |
|---|---|---|---|
| 94025 | 7/1980 | Japan | 29/ |
| 1421087 | 1/1976 | United Kingdom | 29/ |

Primary Examiner—William Briggs
Attorney, Agent, or Firm—Drucker & Sommers

[57] ABSTRACT

An apparatus for automatically assembling immunotesting filter funnels. At a first station, a slotted indexing carousel receives correctly oriented funnel retaining rings. At a second station a disk of filter material is placed in the retaining ring. At a third station a funnel body is placed in the retaining ring. At a fourth station, the funnel body is forced into the retaining ring forming a completed funnel. At a fifth station the completed funnels are removed.

8 Claims, 4 Drawing Sheets

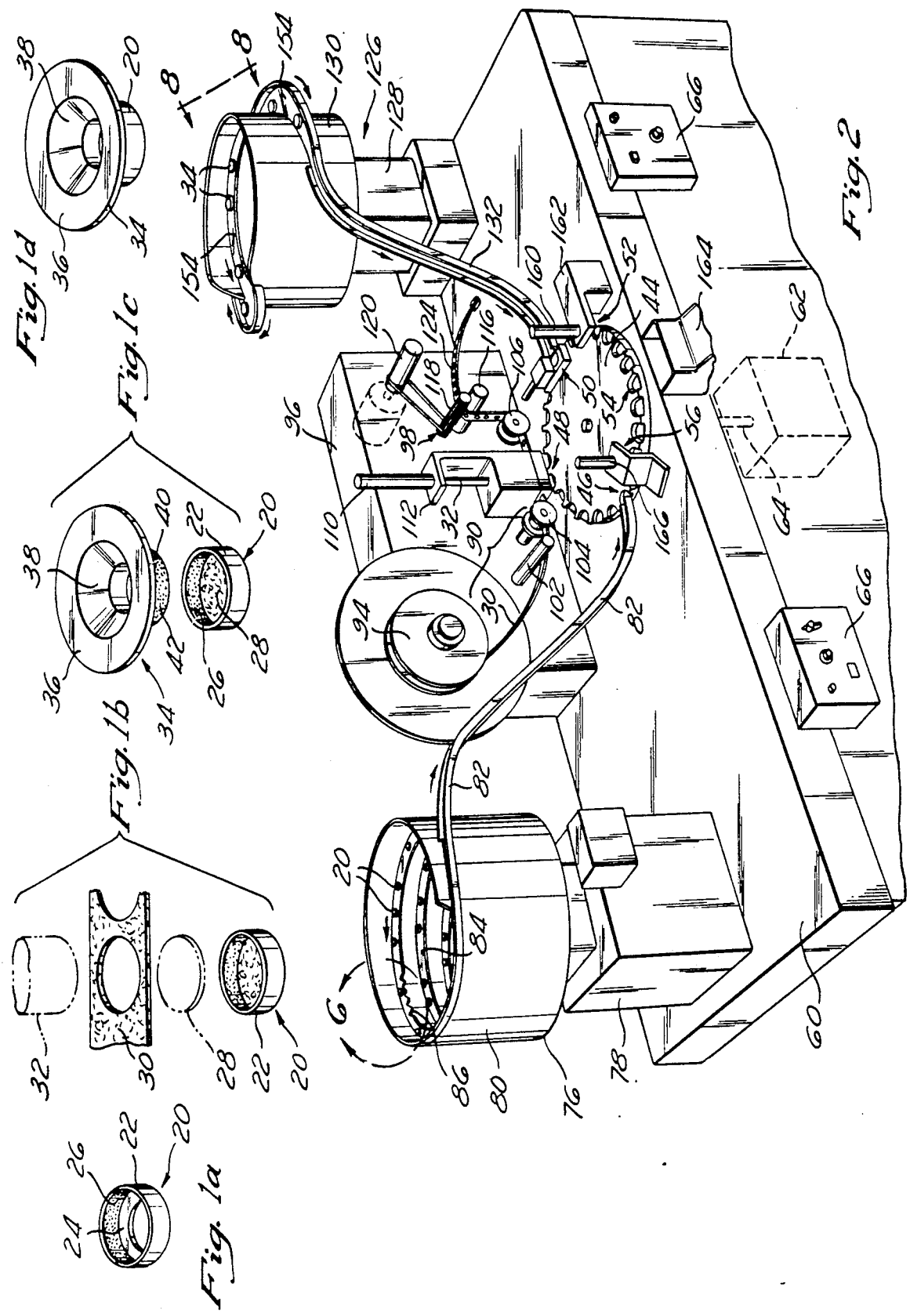

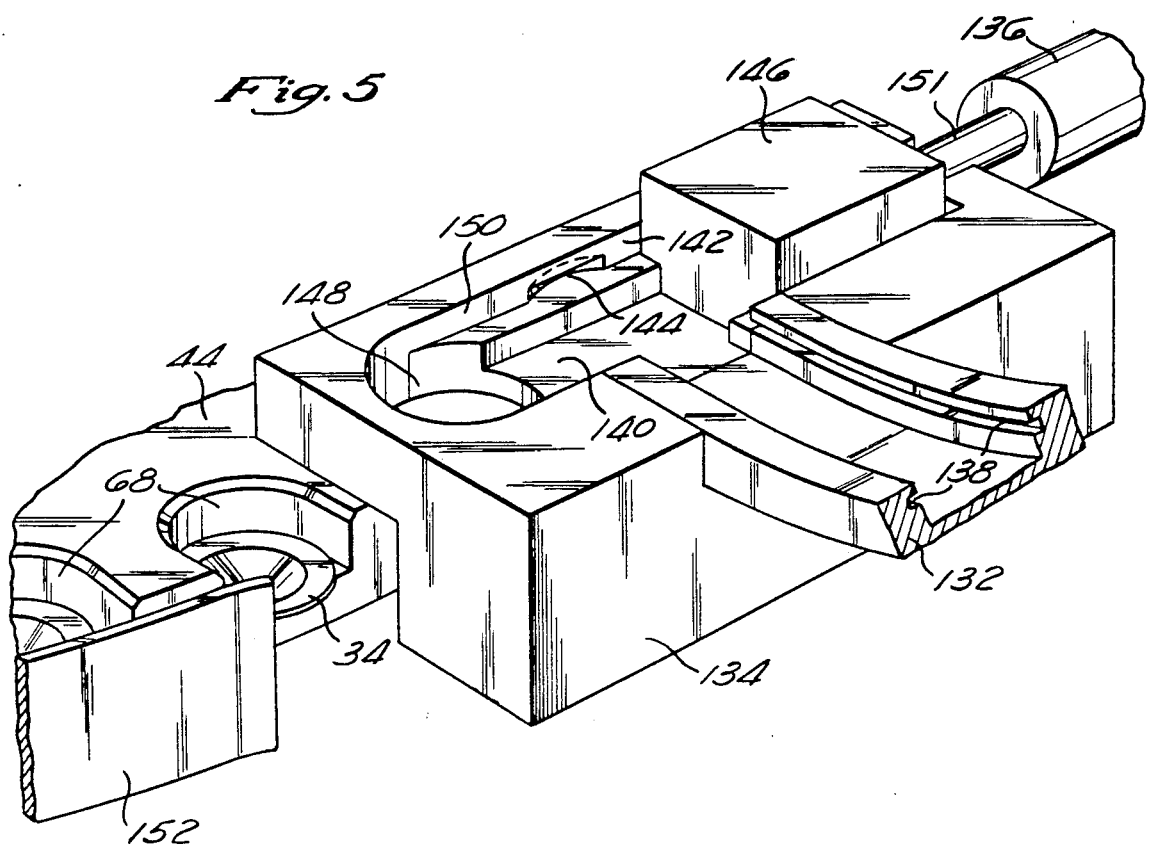
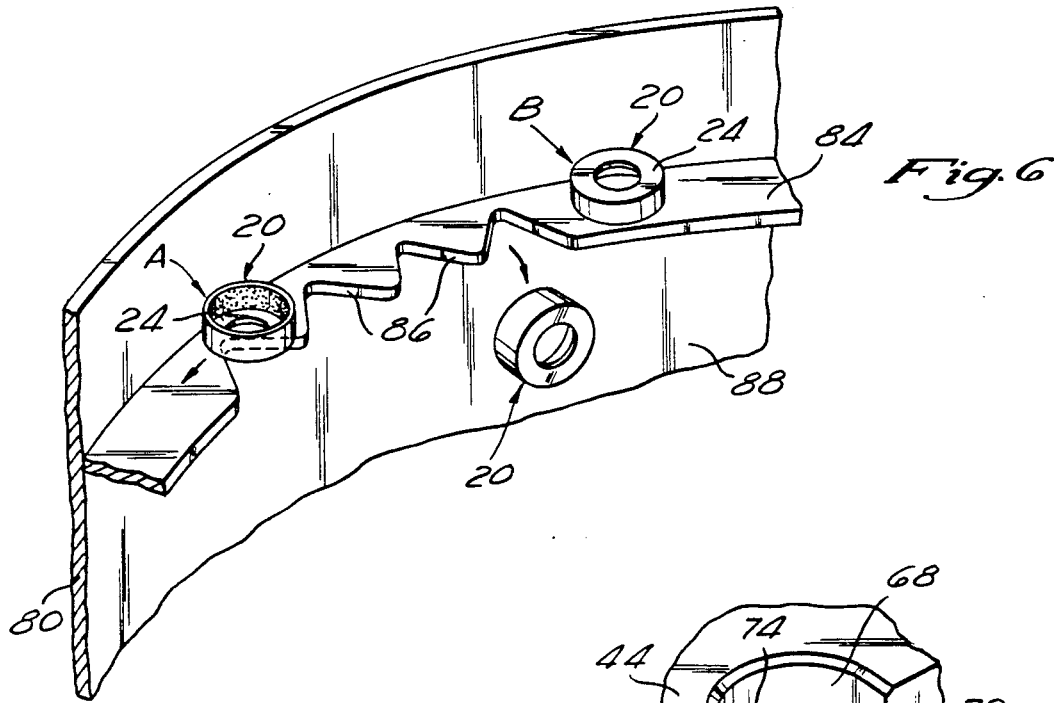
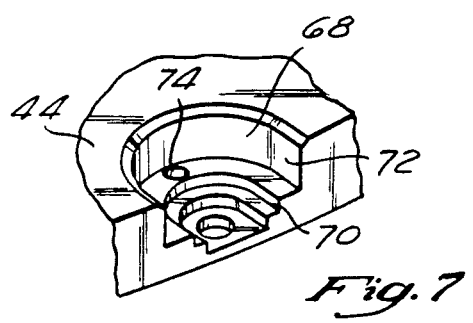

FILTER/FUNNEL ASSEMBLY MACHINE

FIELD OF THE INVENTION

This invention relates to automatic assembling apparatus, particularly apparatus for assembling immunotesting filter funnels.

Filter funnels are widely used in various immunotests. The use of filter funnels allows fluids of biological origin such as blood, serum, urine, and the like to be used without further processing, such as centrifugation, or the like.

Although filter funnels are widely used the conventional assembly method is by hand, one at a time. This is a slow method of assembly. It can also result in handling the filter material and possibly contaminating it.

It would be advantageous to have an automatic assembling apparatus. Such an apparatus would be quicker and less prone to contamination.

SUMMARY OF THE INVENTION

This invention provides an apparatus for automatically assembling immunotesting filter funnels. At a first station, a slotted indexing carousel receives correctly oriented funnel retaining rings. At a second station a disk of filter material is placed in the retaining ring. At a third station a funnel body is placed in the retaining ring. At a fourth station, the funnel body is forced into the retaining ring forming a completed funnel. At a fifth station the completed funnels are removed.

An aspect of this invention is an apparatus for assembling immunotesting filter funnels having a retaining ring, filter material, and a funnel body comprising:

means for transporting funnel components;

means for placing a retaining ring on the means for transporting funnel components in an orientation to receive other components;

means for placing a filter material into the retaining ring;

means for securing a funnel body onto the filter containing retaining ring.

A further aspect of this invention is an apparatus for assembling immunotesting filter funnels comprising:

a slotted indexing carousel;

a first station for placing a retaining ring into a slot on the indexing carousel;

a second station for placing filter material into the retaining ring;

a third station for placing funnel bodies onto the retaining ring;

a fourth station for securing the funnel bodies to the retaining rings; and a fifth station for removing the assembled immunotesting filter funnel from the slotted indexing carousel.

BRIEF DESCRIPTION OF THE DRAWINGS

FIG. 1a shows a perspective view of the retaining ring used in the funnels assembled by the present invention.

FIG. 1b shows a perspective view of the filter tape in relation to the retaining ring.

FIG. 1c shows a perspective view of the funnel body in relation to the retaining ring that has a filter disposed within.

FIG. 1d shows a perspective view of the assembled filter funnel.

FIG. 2 shows a perspective view of the apparatus of this invention.

FIG. 5 shows a detail in perspective of the funnel body loading station of this invention.

FIG. 6 shows a detail in perspective of the retaining ring orientation element of this invention.

FIG. 7 shows a detail in perspective of the funnel assembly slots cut in the indexing carousel of this invention.

DESCRIPTION OF THE PREFERRED EMBODIMENT

Figure 3:
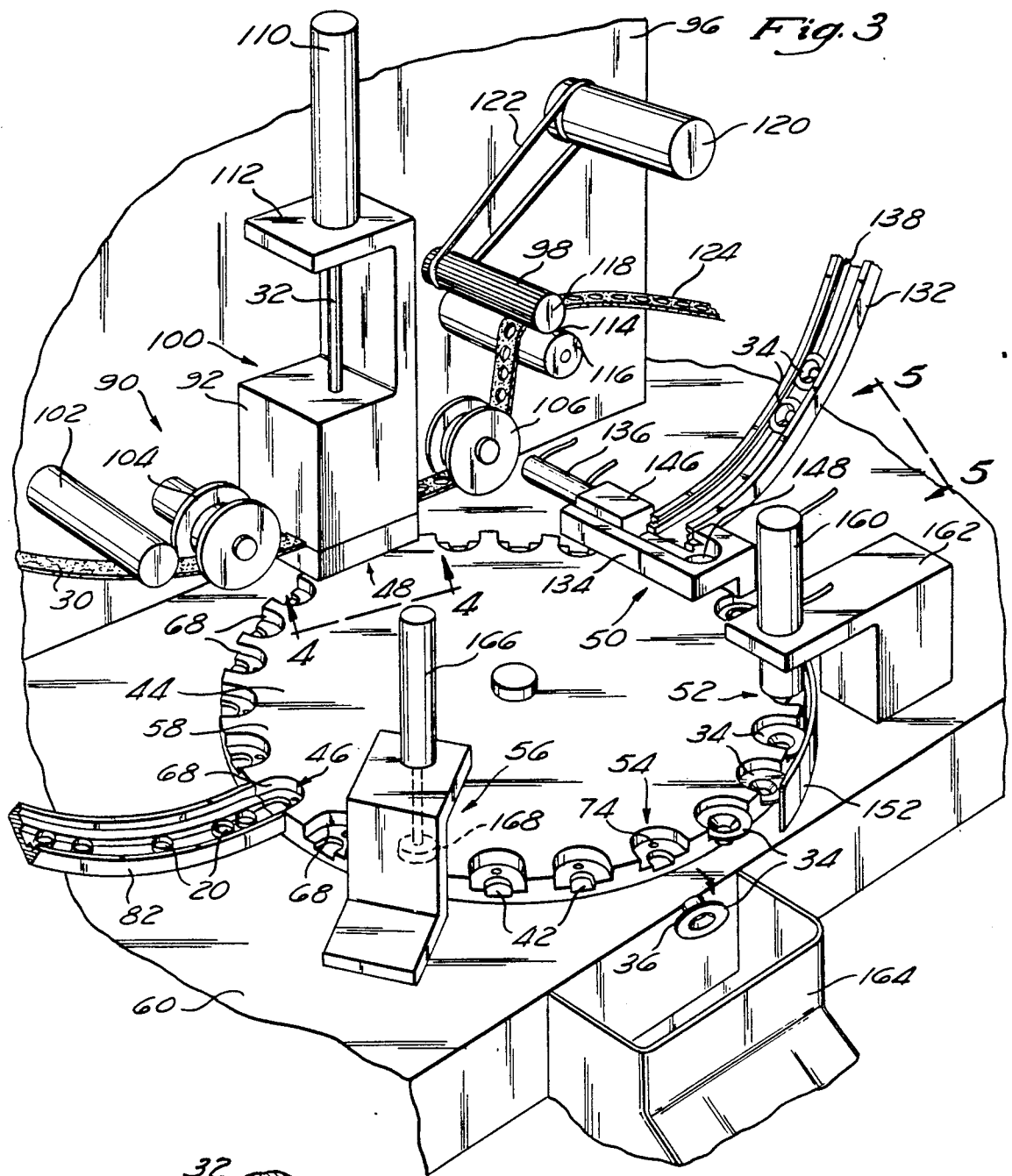
FIG. 3 shows a detail in perspective of the work station of this invention.

Referring to FIG. 1, filtered funnels for use in biological testing, especially immunotesting, include three components shown in FIG. 1b. A first component 20 (shown in FIG. 1a) is a retaining ring having a side wall 22 and an annular member 24. The side wall 22 has a plurality of locking indentations 26 on its inner surface. The second component 28, a disk of filter material, is received within the side wall 22, and rests on the annular member 24 of retaining ring 20. The filter material disk 28 is removed from an elongate filter tape 30 by a punch member 32. The third component shown in FIG. 1c is a funnel member 34. The funnel member has an outer flange 36, an inwardly sloping funnel surface 38, and a tail member 40. The tail member 40 is received within the side wall 22 of the retaining ring 20. Indentations 42 on the outside surface of the tail member 40 interlock with indentations 26 in the retaining ring 20. The tail member 40 locks the filter disk 28 into place. The completed funnel shown in FIG. 1d is then usable for a wide variety of immunotests.

Although the funnel components may be made of any convenient material, metal, wood, or the like, cost considerations and conventional practice dictate the use of molded plastic.

Referring to FIG. 2 the apparatus for making the filter funnels is an automated device which has six stations. An indexing carousel wheel 44 carries the components to each succeeding stations. The indexing carousel wheel 44 has six assembly stations. At a first station 46 the retaining ring 20 is placed onto the indexing carousel wheel 44. At a second station 48 filter material disk 28 is punched from a tape 30 into the retaining ring 20. At the third station 50 the funnel body members 34 are fed onto the indexing carousel. At the fourth station 52, the funnel body members 34 are secured to the retaining rings 20, thereby securing the filter material 28 to the retaining ring 20. At the fifth station 54, an air jet dislodges the assembled funnels from the indexing carousel wheel 44. A sixth station 56 provides a means for anchoring the indexing carousel wheel 44 to accurately align it with the other five stations.

Indexing carousel wheel 44 is rotatably mounted on top 58 of table 60, and is rotated by a geneva indexing drive and motor 62 on drive shaft 64 along the wheel's axis (shown in phantom). Control panels 66 are located beneath the table top level 58 of indexing carousel wheel 44.

The indexing carousel wheel 44 has a plurality of assembly slots 68 arranged circumferentially therearound, and cut in the periphery thereof.

Referring to FIG. 7 an indexing carousel wheel slot 68 is shown. A first relief 70 accommodates a retaining ring 20. A second relief 72 accommodates the outer flange 36 of a funnel member 34. An air aperture 74 allows access to an air jet at the fifth station 54. The air aperture 74 is on the edge to blow the funnel outer flange 36. This causes the funnels to flip out.

At the first station 46 a vibratory sorter 76, having a vibration motor 78 and a ring holding drum 80 feeds correctly oriented retaining rings 20 to the indexing carousel wheel 44. The rings 20 slide down an inclined rail 82 to the indexing carousel wheel 44 for further assembly. Although the vibratory sorter 76 is commercially available, for example, from FMC, the orienting element, shown in detail in FIG. 6, is custom made for this application.

Referring to FIG. 6, the retaining rings 20 move up the helical ramp 84 in the vibrating sorter 76. They can be oriented correctly, as at A, or incorrectly, as at B. If a retaining ring 20 is correctly oriented, as at A, it will pass over a plurality of sorting fingers 86 being supported by the annular surface 24 of the retaining ring 20 that allows the retaining ring 20 to pass over the plurality of sorting fingers 86 without falling. But the incorrectly oriented retaining ring, as at B, has no broad support, therefore when it moves over the sorting fingers 86 its center of gravity causes it to fall back into the bin 88. This assures that only correctly oriented retaining rings 20, as at A, will reach the inclined rail 82 and be fed to the indexing carousel wheel 44.

Referring to FIG. 3 at the first station 46 correctly oriented retaining rings 20, as at A in FIG. 6, slide down the inclined rail 82 from the vibratory retaining ring sorter 76. The retaining rings 20 are received by a reception slot 68, one of a plurality of slots 68 in the indexing carousel wheel 44. The retaining rings 20 are then rotated to the second station 48, thereby presenting the next reception slot 68.

The retaining ring inclined rail 82 aligns with the reception slot 68, which has a relief large enough to accommodate only one retaining ring 20 at a time. The next retaining ring 20 is urged into the next reception slot 68 by the weight of the retaining rings 20 held on the sloping retaining ring inclined rail 82.

The second station 48 has two major components. First a filter material feed and advance 90 feeds an uncut tape 30 of filter material to the second major component, the filter material punch 92. The filter material feed 90 has one spool 94 of filter tape 30 shown mounted on a supporting block 96. If more than one strip is joined to make a lamination of filter material 30 then more than one spool 94 of filter material 30 can be mounted above each other on the supporting block 96. Second, the filter tape 30 is advanced by a motor driven advance 98 and fed through a punch 100.

The punch 100 is powered by a first air piston 110. The punch member 32 descends and cuts filter disks 28 sized to fit the retainer ring 20. The disks 28 are punched out, then forced down and into the ring 20. As the punch 100 withdraws it contacts a stepper motor trigger. The motor driven advance 98 advances the filter tape 30 so a new uncut surface presents itself to the filter punch 100.

Figure 4:
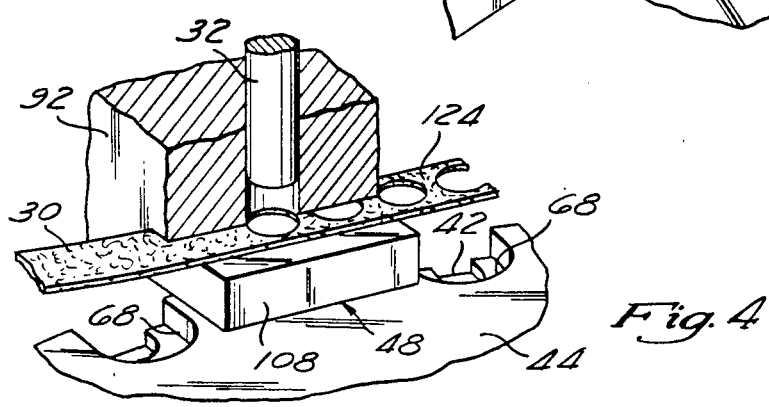
FIG. 4 shows a detail having a partial cut away in perspective of the punching station of this invention.

At the second station 48, a filter tape 30 is fed under a non-rotating spindle 102 that provides an amount of friction. A first aligning spindle 104 and a second aligning spindle 106 direct the filter tape 30 through the filter material punch 100. As shown in FIG. 4, the punch 100 has a cutting punch member 32 that descends, and contacts the filter tape 30 thereby forcing a disk 28 of filter material through a die member 108 that mates with the cutting punch member 32. The filter disk 28 that results from the punching of the filter falls onto the retaining ring 20 positioned in the carousel slot 68 below.

The cutting punch member 32 is moved by a first air piston 110, mounted on a mounting bracket 112. It is preferred that the mounting bracket 112 be accessible to allow the changing of cutting members. This is important if some filter material is glass and some filter material is paper. Glass tends to be fragile, but abrasive thereby requiring a relatively dull blade whereas paper is tougher, thereby requiring a sharp blade, and less abrasive. Each type of filter material requires its own dedicated cutting member.

The punched filter tape 30 is threaded through the second aligning spindle 106 and through a slot 114 formed by a rotating guide spindle 116 and a driven spindle 118. The driven spindle 118 has indentations to grip the filter tape 30. As shown, the driven spindle 118 is driven by a master spindle 120 which is connected to a stepper motor. A belt 122 connects the two spindles.

The filter tape 30 is gently stretched between the nonrotating spindle 102, where it is influenced by friction, and the slot 114. As a result, the filter tape 30 presents a flat easily cut surface to the punch member 32. The punched tape formed 124 is discarded.

At the second station 48, the quantity of usable funnels produced is highly dependent on the filter material used. A filter material that cuts easily and has a fairly high tensile strength results in fewer defective pieces. However, the number of pieces rejected is a secondary consideration, since the choice of filter is largely dependent on the requirements of filtering the biological fluid required by a particular immunoassay.

At the third station 50 the funnel members 34 are correctly oriented by a conventional vibratory sorter 126, having a second vibrating motor 128 and a second drum 130. The sorted funnel members 34 are delivered down a ramp 132 to the indexing carousel wheel 44. The funnel members 34 are received by a receiving table 134 and are then urged into the slot in the carousel slot 68 by a second air piston 136.

Receiving table 134 has funnel receiving hollow portions having an indentation in its side. The funnel member 34 is held by being urged into the indentation by the weight of the plurality of funnel members 34 on the funnel ramp 132. Each funnel member 34 is propelled outwardly onto the receiving table 134 by operation of the second air piston 136. As it reaches the edge it falls onto the retaining ring 20. The third station 50 does not secure the funnel member 34 into the retaining ring 20.

The retaining ring 20 with a disk 28 of filter material is then transported to the third station 50 by the indexing carousel wheel 44. The funnel members 34 are gravity fed down the ramp 132 from the vibrating funnel sorter 126. The outer flange 36 of the funnel member 34 mates with a pair of slots 138 in the ramp 132, thereby falling oriented correctly into the funnel feeding member.

Referring to FIG. 5, the ramp 132 mates with the funnel receiving table 134. The supporting surface of the ramp 132 curves into and is continuous with the supporting bottom surface 140 of the funnel receiving table 134. The funnel member 34 is urged into contact with the facing wall 142 by the weight of the plurality of funnel members 34 on the ramp 132. A relief 144 in the facing wall 142 receives the outer flange 36 of the funnel member 34, thereby anchoring the funnel member 34. A second air piston 136 moves a piston head 146 that urges each succeeding funnel member 34 toward an aperture 148 through which the funnel member 34 falls through onto a slot 68 below that contains a retaining ring 20 and a filter disk 28.

The piston head 146 slides in a funnel body groove 150. As shown, the piston head 146 is cut to exactly match the contour of the groove 150, but this is not essential. A linkage rod 151 links the piston head 146 to the second air piston 136.

After the slot 68 receives the funnel member 34 the indexing carousel wheel 44 carries the unattached components of the completed funnel to the fourth station 52. An outer plate 152 prevents any components from falling off the indexing carousel wheel 44.

Figure 8:
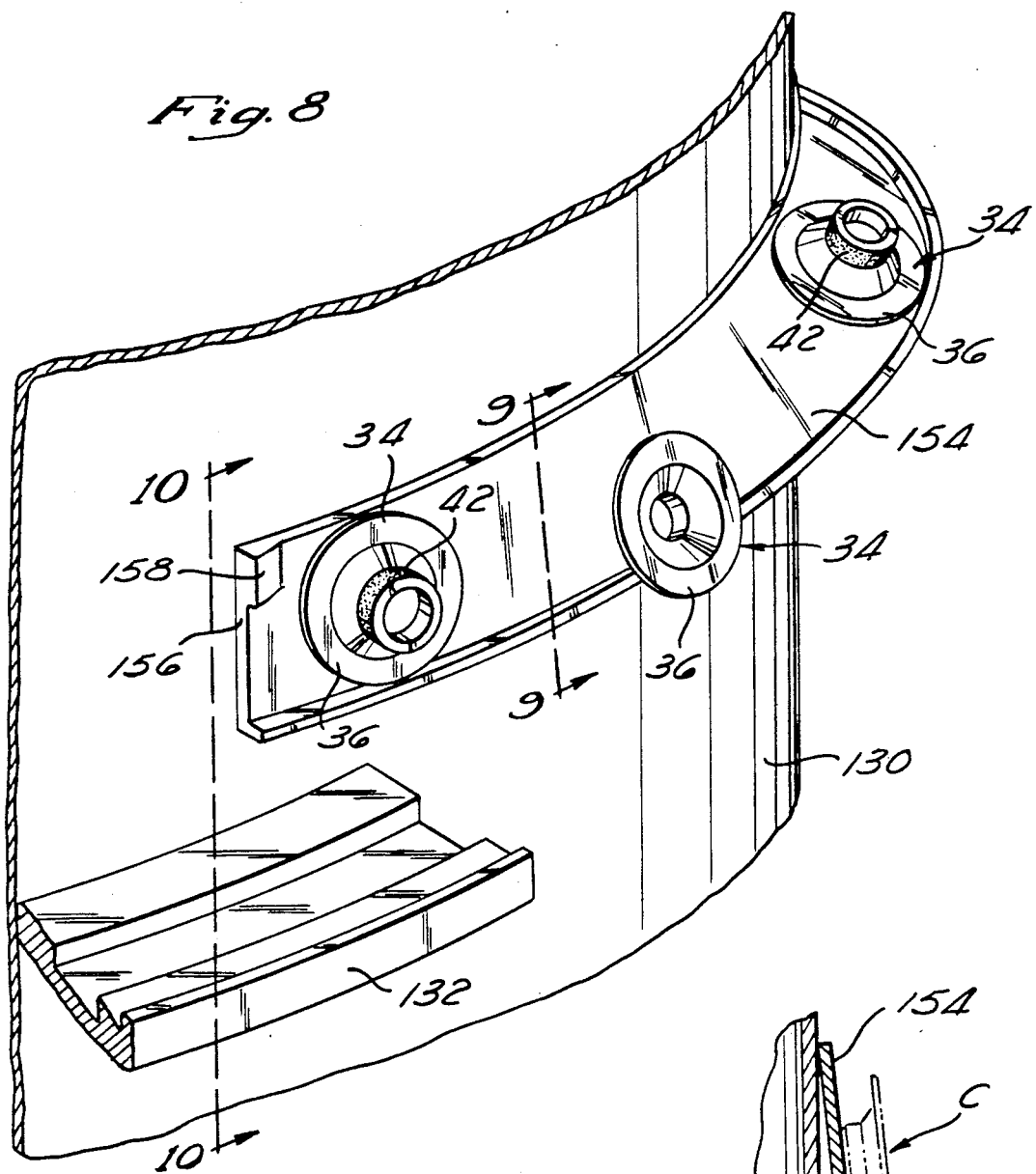
FIG. 8 shows a detail in perspective of the funnel body orienting element of this invention.

Referring to FIG. 8, the funnel members 34 move upwardly on a vibratory funnel outer ramp 154 as urged by the vibrating sorter 126. As shown in FIG. 2, the funnel sorter ramp 154 crosses over to the outside of the second drum 130. As it nears its end the angle between the side of the second drum 130 and the ramp 154 relative to the second drum 130 increases from approximately 90° to nearly 180°.

Figure 9:
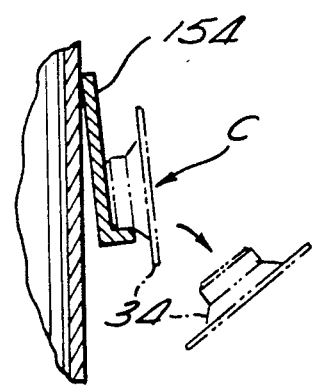
FIG. 9 shows a cut away view of FIG. 8 showing an incorrectly oriented funnel body falling from the orientation element of this invention.
Figure 10:
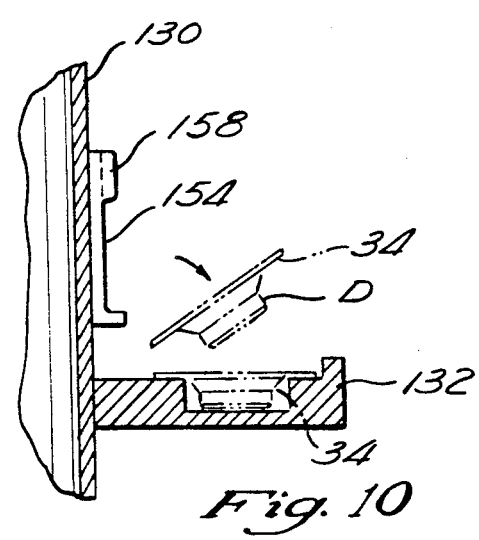
FIG. 10 shows a cut away view of FIG. 8 showing a correctly oriented funnel body falling onto a delivery chute in the orienting element of this invention.

Referring to FIG. 9, incorrectly oriented funnel members 34, those having the outer flange 36 face outwardly, as at C, will fall off. The incorrectly oriented funnel members 34 fall into a hopper (not shown) that feeds the second drum 130, extending outwardly from the walls of the drum 130. The correctly oriented funnel body members 34, as at D, can be supported in an almost vertical orientation. When the correctly oriented funnel members 34 reach the end 156 of the vibrating pathway, a projection 158 pushes them over, forcing them to fall on the end of the ramp 132 as shown in FIG. 10. The funnel members 34 fall outer flange side 36 upwardly, in the correct orientation to be received by the retaining rings 20 on the indexing carousel wheel 44.

The fourth station 52 is the assembly station. The funnel bodies 34 are pressed into the retaining ring 20 by a third air piston—thereby forming the final product. The indentations 26 in the wall 22 of the retaining ring 20 and the indentations 42 on funnel body tail 40 mesh and secure the final product.

Since most stations are moved by air pressure, a single master air switch can be used to time all station movements. The sixth station 56 is usually engaged first, therefore, it is given larger tubing and a more fully opened valve, thereby forcing it to descend slightly faster than any other piston. This assures that the wheel will be locked in the correct position before any assembling steps are initiated.

Referring to FIG. 3, at the fourth station 52 a piston descends, moved by a third air piston 160, thereby forcing the funnel tail member 40 into the retaining ring 20. The third air piston 160 is supported by a bracket 162. The interior locking indentations 26 in the retaining ring 20 and the exterior indentations 42 in the tail member 40 of the funnel interfere, thereby mating and the assembled unit is ready for use. The indexing carousel wheel 44 transports the assembled funnel to the fifth station 54 for unloading.

The fifth station 54 is the unloading station. An air jet under the indexing carousel wheel 44 blows the completed part out of the slot 68 and into a receiving container.

At the fifth station 54, referring to FIG. 7, a jet of air blows through an air hole 74 in the slot 68, blowing the assembled funnel from the slot 68 into a receiving bin 164, as shown in FIG. 3. The jet blows through an air hole 74 in the slot 68. When the air hole 74 aligns with a source of pressurized air beneath the table top 58 a jet of air then ejects the finished funnel.

The sixth station 56 is the guide station. The indexing carousel wheel 44 may have play in its position, thereby creating misalignments at the various stations. An air piston at the sixth station 56 engages the carousel indexing wheel 44 and aligns it.

At the sixth station 56, referring to FIG. 3, a fourth air piston 166 extends a slot engagement head 168 downwardly to mate with a slot 68. The head 168 engages the slot 68 rapidly thereby precisely aligning the indexing carousel wheel 44 to all other stations. Because it is important that the indexing carousel wheel 44 be aligned first, before any other station 56 functions it is preferred that the air valves to the sixth station allow more air to the fourth air piston 166.

In operation the carousel rotates in step fashion, passing each assembly slot by each assembly station. Each station then performs its function in sequence to the contents of each of the carousel's rotating slots. The wheel is rotated by a geneva indexing drive and motor 62 on drive shaft 64 along the wheel's axis (shown in phantom).

The apparatus is conveniently operated by an operator using the control panels 66 located beneath the table top level 58 of the indexing carousel wheel 44. The timing requirements are met by running all stations off one pressurized air system. All stations are activated by one air switch synchronized to operate during the dwell time of the geneva mechanism. No activity at the stations takes place during the indexing operation of the geneva drive 62. The trigger to operate the stepper motor to advance the filter tape 30 is activated by raising cylinder 110.

A preferred embodiment of the invention has been set forth above, for the purpose of explaining the invention. However, it is to be understood that variations may be made in such embodiment, which variations may nevertheless be within the scope and spirit of the invention as set forth in the claims.

I claim:

1. An apparatus for assembling immunotesting filter funnels comprising:
   a slotted indexing carousel;
   a first station for placing a retaining ring into a slot on the indexing carousel;
   a second station for placing filter material into the retaining ring;
   a third station for placing a funnel body onto the retaining ring;
   a fourth station for securing the funnel bodies to the retaining rings to thereby assemble said immunotesting filter funnels;

a fifth station for removing each said assembled immunotesting filter funnel from said slotted indexing carousel; and a sixth station to force said slotted indexing carousel into an exact predetermined position.

2. The apparatus of claim 1, wherein the slotted indexing carousel is rotated by a stepper motor.

3. The apparatus of claim 1, wherein all stations are timed to function simultaneously, then the slotted indexing carousel moves up one position and all stations repeat each function simultaneously.

4. The apparatus of claim 1 wherein said second station provide laminated filter feed from more than one spool.

5. The apparatus of claim 1, wherein said first station for placing a retaining ring into a slot on said indexing carousel includes an inclined chute for feeding of each retaining ring into said slot on said indexing carousel.

6. The apparatus of claim 1, wherein said second station for placing filter material includes a cutting member for cutting disks of filter material from a filter material tape.

7. The apparatus of claim 1, wherein said fourth station for securing said funnel body includes a means for placing said funnel body onto said retaining ring.

8. The apparatus of claim 1, wherein said first station for placing a retaining ring into a slot on said indexing carousel includes means for correctly orienting each said retaining ring prior to placement into said slot on said indexing carousel.

* * * * *